US008589938B2

(12) United States Patent
Craik et al.

(10) Patent No.: US 8,589,938 B2
(45) Date of Patent: Nov. 19, 2013

(54) COMPOSITE CONTENTION AWARE TASK SCHEDULING

(75) Inventors: Christopher J. Craik, Austin, TX (US); Damir A. Jamsek, Austin, TX (US); Jian Li, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 13/039,401

(22) Filed: Mar. 3, 2011

(65) Prior Publication Data

US 2012/0227051 A1 Sep. 6, 2012

(51) Int. Cl.
*G06F 9/00* (2006.01)
*G06F 9/50* (2006.01)

(52) U.S. Cl.
USPC .......................................................... 718/104

(58) Field of Classification Search
USPC .......................................................... 718/104
See application file for complete search history.

(56) References Cited

U.S. PATENT DOCUMENTS

| | | | | |
|---|---|---|---|---|
| 2003/0163506 | A1* | 8/2003 | Dmitriev | 709/1 |
| 2004/0199919 | A1* | 10/2004 | Tovinkere | 718/102 |
| 2007/0294696 | A1* | 12/2007 | Papakipos et al. | 718/102 |
| 2008/0184241 | A1* | 7/2008 | Headrick et al. | 718/102 |
| 2009/0307704 | A1* | 12/2009 | Munshi et al. | 718/104 |
| 2010/0218196 | A1* | 8/2010 | Leung et al. | 718/107 |
| 2010/0235845 | A1 | 9/2010 | Bates et al. | |

OTHER PUBLICATIONS

USPTO U.S. Appl. No. 13/589,718.
Cheng, Hsiang-Yun et al., "An Analytical Model to Exploit Memory Task Scheduling", INTERACT-14: Proceedings of the 2010 Workshop on Interaction between Compilers and Computer Architecture, ISBN: 978-1-60558-921-3, 2010, 8 pages.
Cheng, Hsiang-Yun et al., "Memory Latency Reduction via Thread Throttling", 2010 43rd Annual IEEE/ACM International Symposium on Microarchitecture, Atlanta, Georgia, ISBN: 978-0-7695-4299-7, Dec. 4-Dec. 8, 2010, 12 pages.
Li, Jian et al., "Dynamic Power-Performance Adaptation of Parallel Computation on Chip Multiprocessors", High-Performance Computer Architecture (HPCA), Feb. 2006, 11 pages.
Sinnen, Oliver et al., "Contention-Aware Scheduling with Task Duplication", Job Scheduling Strategies for Parallel Processing, Lecture Notes in Computer Science, vol. 5798/2009, 2009, pp. 157-168.
Office Action mailed Feb. 26, 2013 for U.S. Appl. No. 13/589,718; 18 pages.

* cited by examiner

*Primary Examiner* — Emerson Puente
*Assistant Examiner* — Charlie Sun
(74) *Attorney, Agent, or Firm* — Stephen R. Tkacs; Stephen J. Walder, Jr.; Eustus D. Nelson

(57) ABSTRACT

A mechanism is provided for composite contention aware task scheduling. The mechanism performs task scheduling with shared resources in computer systems. A task is a group of instructions. A compute task is a group of compute instructions. A memory task, also referred to as a communication task, may be a group of load/store operations, for example. The mechanism performs composite contention-aware scheduling that considers the interaction among compute tasks, communication tasks, and application threads that include compute and communication tasks. The mechanism performs a composite of memory task throttling and application thread throttling.

18 Claims, 5 Drawing Sheets

COMPOSITE CONTENTION AWARE TASK SCHEDULING

BACKGROUND

The present application relates generally to an improved data processing apparatus and method and more specifically to mechanisms for composite contention aware task scheduling.

Resource contention is a conflict over access to shared resources, such as memory, disk storage, I/O devices, and cache. Multi-processor data processing systems may have shared memories, for instance. Multi-threaded processors may have a plurality of threads accessing the same caches. Multi-processor and multi-threaded data processing systems may experience latency due to resource contention despite the obvious advantages of multi-processing and multi-threading.

For example, many programs can be broken up into compute tasks and communication tasks. Compute tasks are portions of code that perform computational functions, such as arithmetic functions. Communication tasks are portions of code that perform I/O functions, such as accesses (i.e., load/store) to memory or persistent storage. When several threads access shared resources at the same time, resource contention may introduce latency into the threads.

SUMMARY

In one illustrative embodiment, a method, in a data processing system, for composite contention-aware task scheduling comprises decomposing an application into application threads, compute tasks, and memory tasks. The data processing system comprises a number of processors. A compute task comprises a group of instructions that perform computational functions. A memory task is a group of instructions that perform memory access operations. The method further comprises determining a number of application threads and a number of concurrent memory or compute tasks. The number of application threads and the number of concurrent memory tasks or concurrent compute tasks are less than or equal to the number of hardware threads that can run concurrently on the processors. In a simultaneous multithreading (SMT) enabled processor, more than one hardware thread can run on the same processor. The method further comprises scheduling the application threads, the compute tasks, and the memory tasks on the number of processors based on the number of application threads, the number of compute tasks, and the number of memory tasks or concurrent compute tasks.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for composite contention aware task scheduling. The mechanism performs task scheduling with shared resources in computer systems. A task is a group of instructions. A compute task is a group of compute instructions. A memory task, also referred to as a communication task, may be a group of load/store operations, for example. The mechanism performs composite contention-aware scheduling that considers the interaction among compute tasks, communication tasks, and application threads that include compute and communication tasks. The mechanism performs a composite of memory task throttling and application thread throttling.

Figure 1:
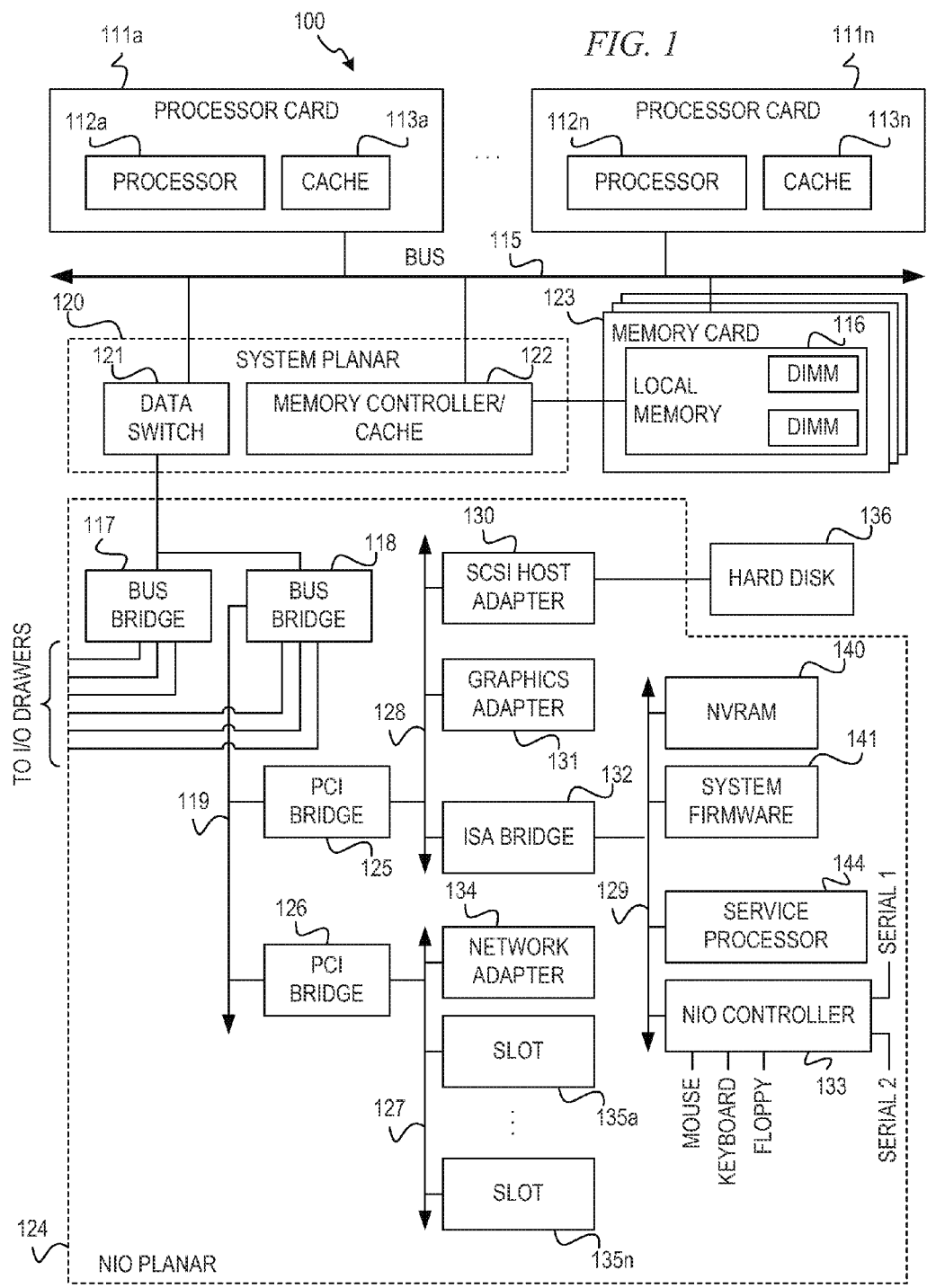
FIG. 1 is a block diagram of a data processing system with which aspects of the illustrative embodiments may advantageously be utilized.

The illustrative embodiments may be utilized in many different types of data processing environments including a distributed data processing environment, a single data processing device, or the like. In order to provide a context for the description of the specific elements and functionality of the illustrative embodiments, FIG. 1 is provided hereafter as example environments in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

FIG. 1 is a block diagram of a data processing system with which aspects of the illustrative embodiments may advantageously be utilized. As shown, data processing system 100 includes processor cards 111a-111n. Each of processor cards 111a-111n includes a processor and a cache memory. For example, processor card 111a contains processor 112a and cache memory 113a, and processor card 111n contains processor 112n and cache memory 113n.

Processor cards 111a-111n are connected to main bus 115. Main bus 115 supports a system planar 120 that contains processor cards 111a-111n and memory cards 123. The system planar also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119, PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a-135n via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

Data processing system 100 is an example of a multiprocessing system with shared resources. For example, processor cards 111a-111n may share memory 116. Furthermore, processor card 111a may have more than one processor 112a, and/or processor 112a may have multiple cores or may be a multi-threaded processor. In accordance with an illustrative embodiment, an operating system or virtualization layer performs task scheduling with a composite of memory task throttling and application thread throttling as will be described below.

Figure 2:
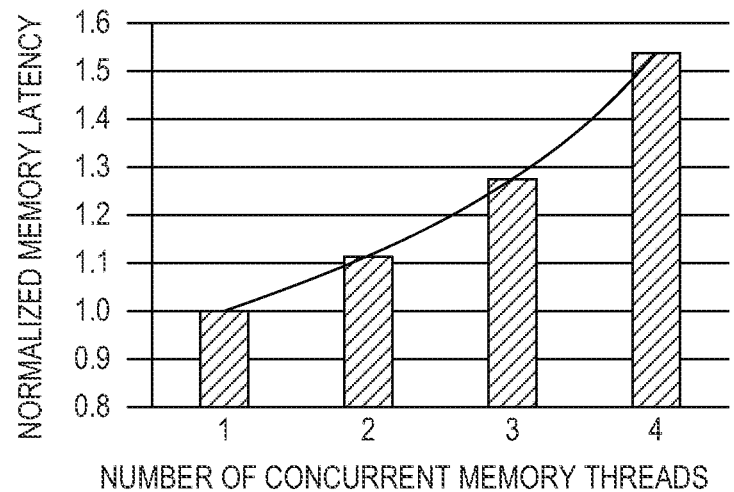
FIG. 2 is a graph illustrating normalized memory latency versus number of concurrent memory threads in accordance with one aspect of the illustrative embodiments.

When a task scheduler in an operating system or virtualization layer schedules the same type of tasks without considering the interaction between different types of tasks in a multi-dimensional space, the tasks experience memory latency due to resource contention. FIG. 2 is a graph illustrating normalized memory latency versus number of concurrent memory threads (CMT) in accordance with one aspect of the illustrative embodiments. As seen in FIG. 2, as the number of threads performing memory (communication) tasks concurrently increases, memory latency increases substantially.

In one aspect of the illustrative embodiments, the task scheduler divides threads into groups of compute tasks and memory tasks. Compute tasks are groups of instructions that perform computational functions, such as arithmetic functions. Memory tasks generally are groups of instructions that perform input/output functions or, more particularly, load/store operations. In accordance with this aspect of the illustrative embodiments, the task scheduler performs memory task throttling such that fewer threads perform memory tasks concurrently to reduce memory latency due to resource contention.

Figure 3:
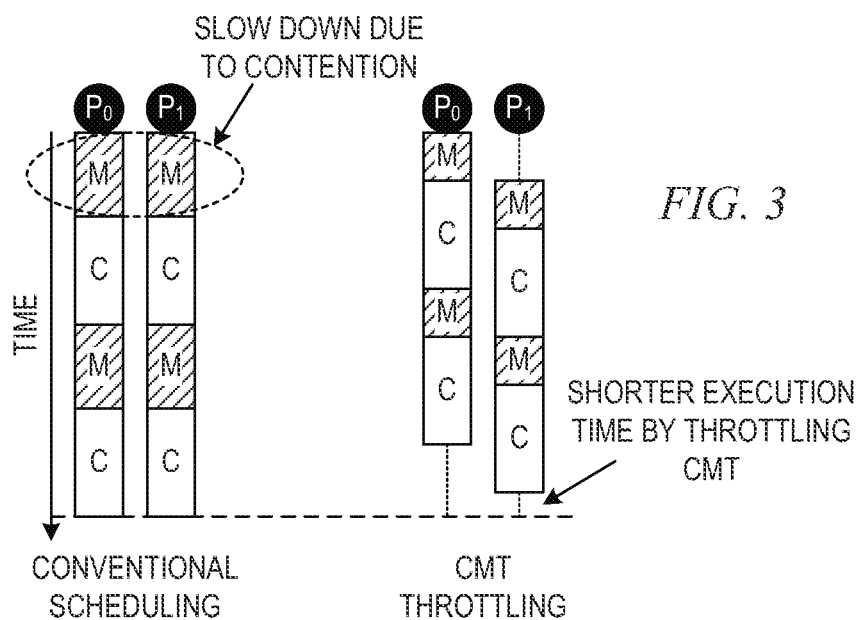
FIG. 3 is a diagram illustrating memory task throttling in accordance with one aspect of the illustrative embodiments.

FIG. 3 is a diagram illustrating memory task throttling in accordance with one aspect of the illustrative embodiments. With conventional scheduling, the task scheduler schedules memory tasks on a first processor ($P_0$) and a second processor ($P_1$) without considering the interaction between concurrent memory tasks. As seen in FIG. 3, the threads on $P_0$ and $P_1$ experience slow down due to resource contention.

With concurrent memory task (CMT) throttling, the thread on $P_1$ does not begin its memory task until the memory task on processor $P_0$ completes. As seen in FIG. 3, the two threads complete with shorter execution time. In this example, the shorter execution time is for two threads executing two memory tasks and two compute tasks; however, in a data processing system running thirty-two threads concurrently with hundreds or thousands of memory tasks, the improvement in execution time would be significant.

Figure 4:
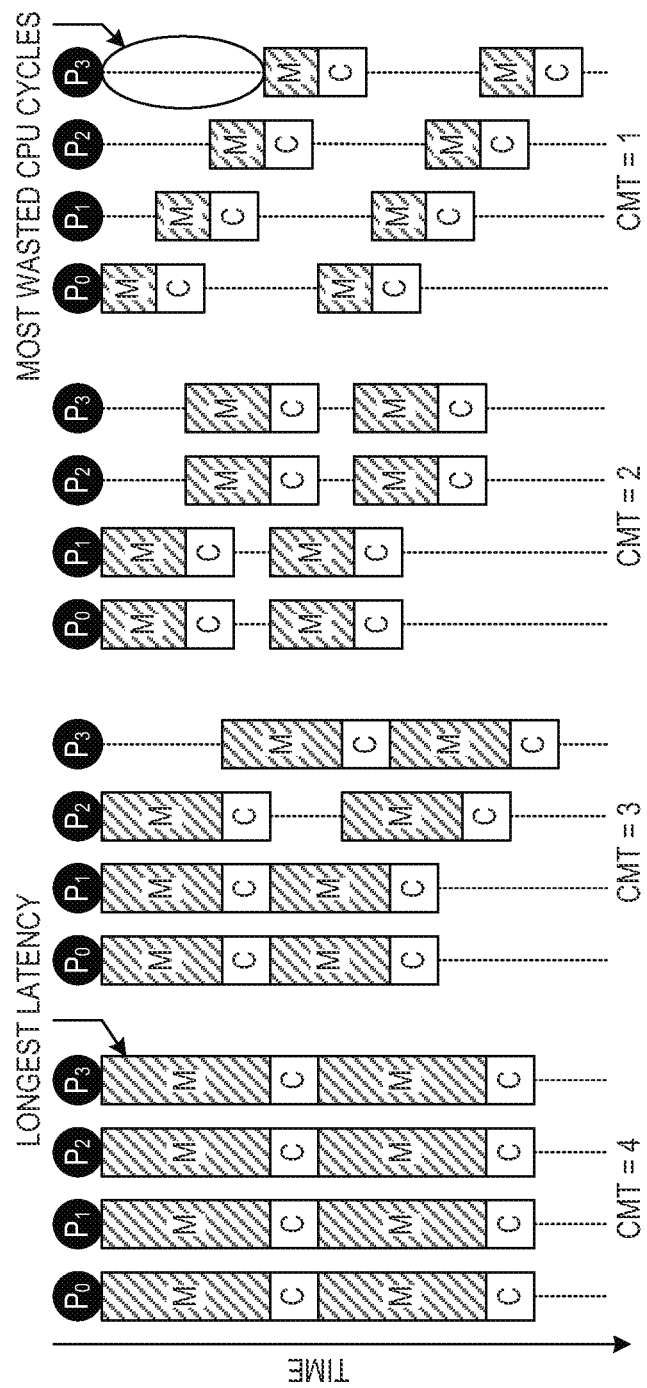
FIG. 4 is a diagram illustrating memory task throttling with four processor threads in accordance with one aspect of the illustrative embodiments.

FIG. 4 is a diagram illustrating memory task throttling with four processor threads in accordance with one aspect of the illustrative embodiments. As seen in FIG. 4, the threads experience the longest latency when four threads may run memory tasks concurrently (CMT=4). With CMT=1, meaning only one thread may run a memory task at a time, the threads experience the most wasted CPU cycles as threads wait for their turn to run a memory task. The task scheduler in the illustrative embodiment determines the optimal number of concurrent memory tasks. In the example depicted in FIG. 4 with four processor threads, the optimal number of concurrent memory tasks is two (CMT=2).

In accordance with another aspect of the illustrative embodiments, the task scheduler performs application thread throttling. In multi-processor and/or multi-threaded data processing systems, the threads contend for resources, such as cache. In certain instances, the data processing system may perform the same amount of work with fewer processors.

Figure 5:
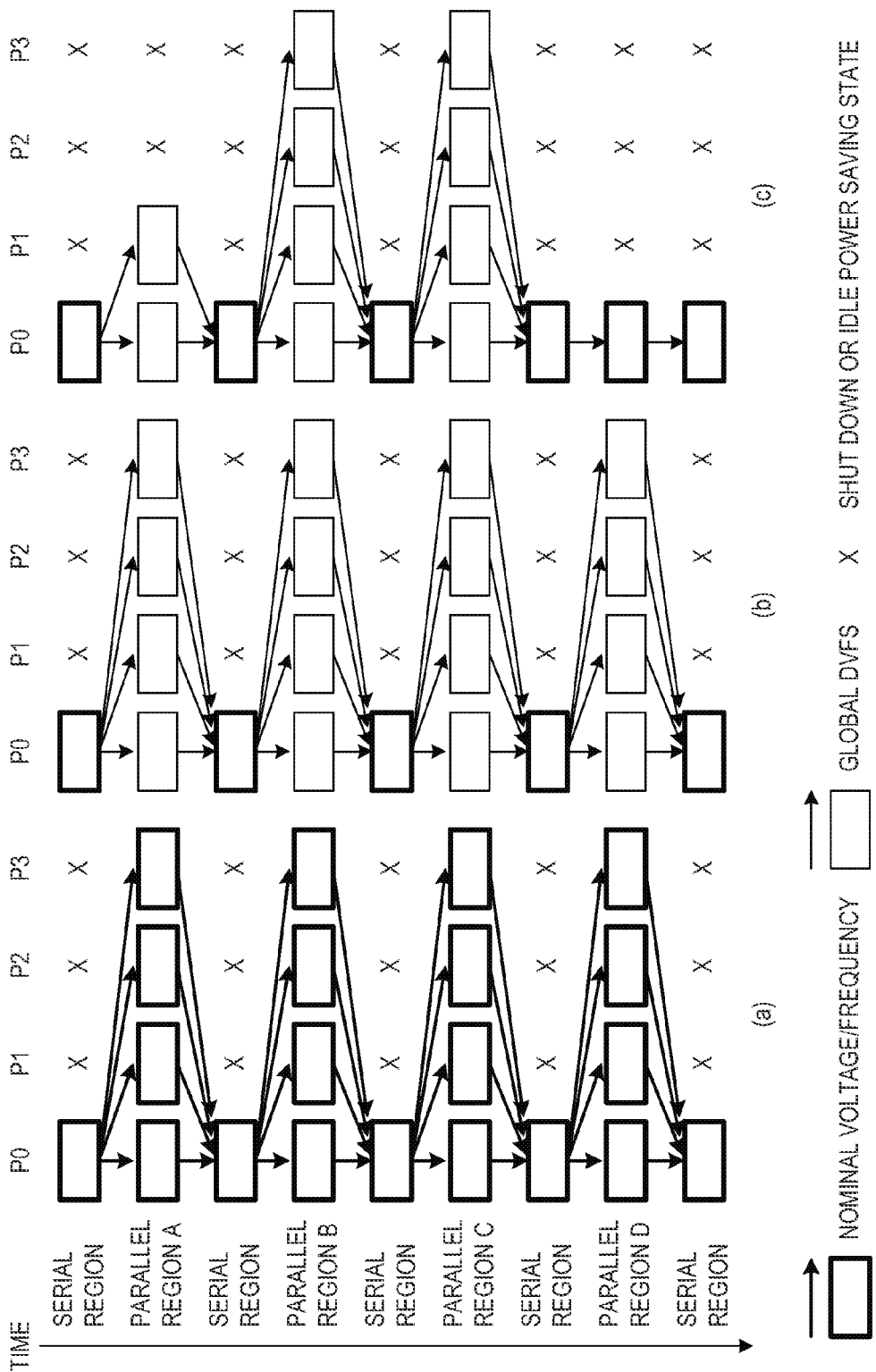
FIG. 5 is a diagram illustrating application thread throttling in accordance with an illustrative embodiment.

FIG. 5 is a diagram illustrating application thread throttling in accordance with an illustrative embodiment. In example (a), the application is divided into serial regions and parallel regions. During serial regions, the application runs on processor P0, while processors P1, P2, P3 are shut down. During parallel regions, the application runs on all processors P0, P1, P2, P3 running at nominal voltage/frequency.

In example (b), the application runs on all processors at reduced power during parallel regions. The task scheduler may use Dynamic Voltage and Frequency Scaling (DVFS). When processor frequency changes, its performance varies. When the supply voltage and processor frequency change, the processor's power consumption varies. Therefore, DVFS is a popular technique to trade off processor performance and power. The task scheduler determines that processors P0, P1, P2, P3 perform the same amount of work during parallel regions with reduced power.

In example (c), the task scheduler determines that parallel region A can run on two processors with reduced power and that parallel region D can run on one processor at nominal voltage/frequency. Thus, the task scheduler throttles full processors, shutting down processors P2, P3 in parallel region A and processors P1, P2, P3 in parallel region D.

In accordance with the illustrative embodiments, the task scheduler decomposes application threads into compute tasks, communication tasks, and application threads (compute tasks+communication tasks). Different types of tasks can be interleaved in sequence in time due to data dependency. The same type of tasks can be parallel. The task scheduler searches for the right number of compute tasks, communication tasks, or application threads in certain order. The task scheduler selects an optimal combination from the search for a certain performance level.

Figure 6:
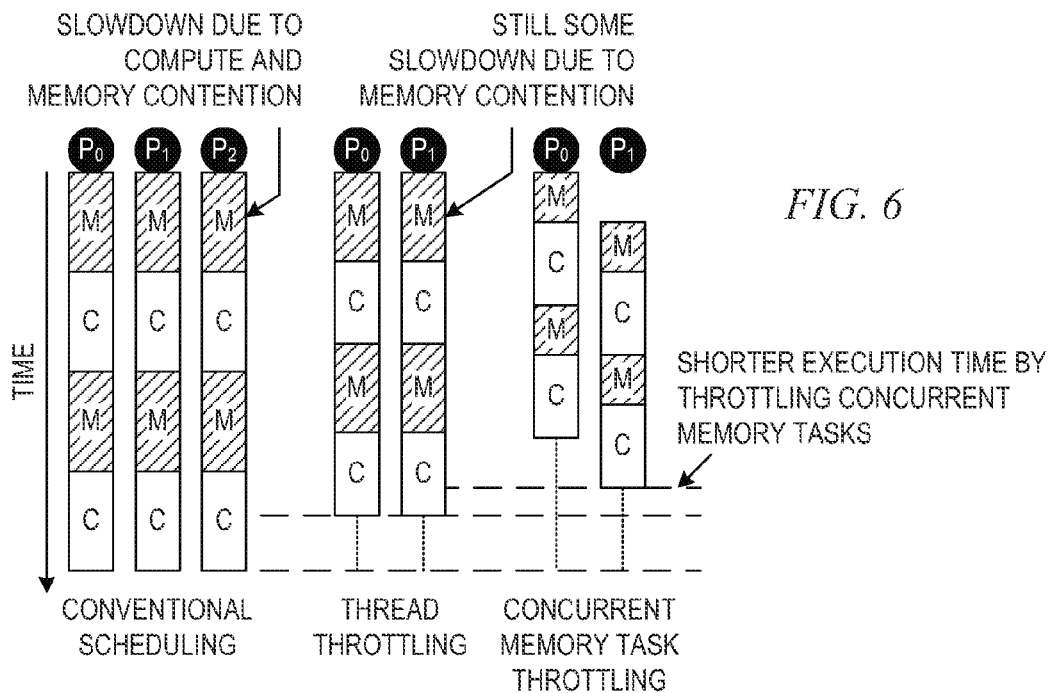
FIG. 6 is a diagram illustrating a combination of concurrent memory task scheduling and application thread throttling in accordance with an illustrative embodiment.

FIG. 6 is a diagram illustrating a combination of concurrent memory task scheduling and application thread throttling in accordance with an illustrative embodiment. With conventional scheduling, the task scheduler runs the application on three processors $P_0$, $P_1$, $P_2$ with memory tasks executing concurrently. As seen in FIG. 6, the threads experience slowdown due to compute and memory contention. Only one iteration of the throttling is illustrated for simplicity.

With thread throttling, the task scheduler runs the application on two processors, $P_0$, $P_1$ with memory tasks executing concurrently. The threads still experience slowdown due to memory contention. With concurrent memory task throttling, the threads experience shorter execution time by throttling concurrent memory tasks. As seen in FIG. 6, the application experiences significantly shorter execution time with a combination of application thread throttling and concurrent memory task throttling.

While not shown explicitly, compute task throttling is beneficial when compute tasks contend for shared resources such as processor pipeline, functional units, register files, etc.

Compute task throttling, memory task throttling, and application thread throttling are all part of the composite contention aware thread and task throttling technique described herein.

In addition to performance, composite contention aware thread and task throttling can be applied to and adjusted by other metrics, such as power and energy consumption.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, device, or any suitable combination of the foregoing. More specific examples (anon-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 7:
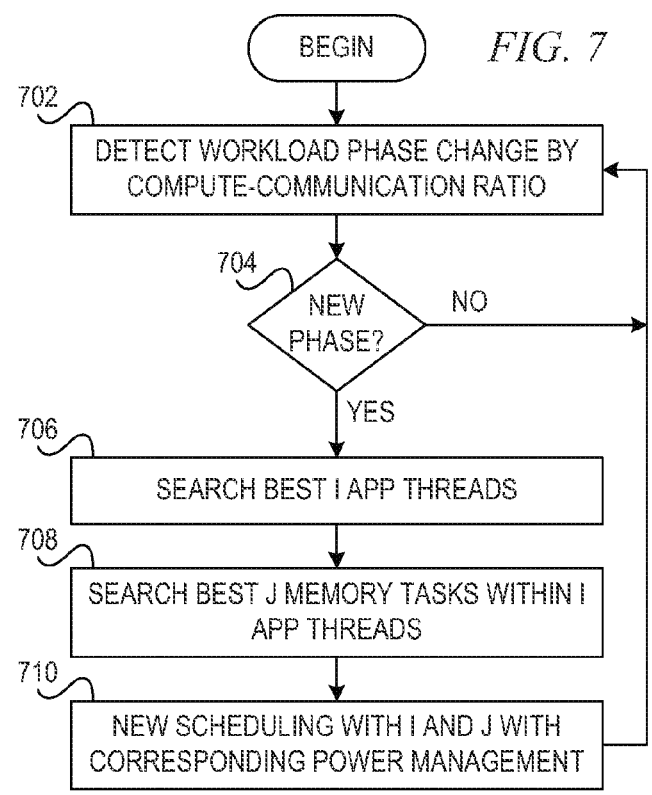
FIG. 7 is a flowchart illustrating operation of a task scheduler for composite contention-aware task scheduling in accordance with an illustrative embodiment.

FIG. 7 is a flowchart illustrating operation of a task scheduler for composite contention-aware task scheduling in accordance with an illustrative embodiment. Operation begins, and the task scheduler detects workload phase change by compute-communication ratio (block 702). The task scheduler determines whether it detects a new phase (block 704). If the task scheduler does not detect a new phase, the task scheduler returns to block 702 to continue detecting a workload phase change.

If the task scheduler detects a new phase in block 704, the task scheduler searches for the best number, I, of application threads (block 706) and searches for the best number, J, of concurrent memory tasks within the I application threads (block 708). Then, the task scheduler performs a new scheduling with I and J with corresponding power management (block 710). Thereafter, operation returns to block 702 to detect workload phase change.

In an alternative embodiment, the task scheduler may search for the best number of concurrent memory tasks and then search for the best number of application threads given the number of concurrent memory tasks. In yet another embodiment, the task, scheduler may search for the best number of application threads and the number of concurrent memory tasks in a single search, although the search space would be very large and the search would require a large overhead with little benefit over the above-mentioned embodiments.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for composite contention aware task scheduling. The mechanism performs task scheduling with shared resources in computer systems. A task is a group of instructions. A compute task is a group of compute instructions, A memory task, also referred to as a communication task, may be a group of load/store operations, for example. The mechanism performs composite contention-aware scheduling that considers the interaction among compute tasks, communication tasks, and application threads that include compute and communication tasks. The mechanism performs a composite of memory task throttling and application thread throttling.

The mechanism identifies a best number of application threads and a best number of concurrent memory tasks within the number of application threads. The mechanism then schedules the application threads on computational resources according to the number of application threads and the number of concurrent memory tasks. The mechanism may be embodied within a compiler or may be a part of runtime thread scheduling, such as in an operating system or virtualization layer.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage medium having a computer readable program stored therein, wherein the computer readable program, when executed on a computing device, causes the computing device to:

divide an application into application threads to be scheduled on a plurality of processors;

divide the application into serial regions and parallel regions;

decompose each application thread into compute tasks and memory tasks, wherein a compute task comprises a group of instructions that perform computational functions and wherein a memory task is a group of instructions that perform memory access operations;

for each parallel region, determine a corresponding number of application threads and a corresponding number of concurrent memory tasks, wherein the number of application threads and the number of concurrent memory tasks are less than the number of hardware threads of the plurality of processors;

for each parallel region, schedule the application threads, and the compute tasks and the memory tasks within each application thread, on the number of hardware threads of the plurality of processors based on the corresponding number of application threads and the corresponding number of concurrent memory tasks; and apply power management to the plurality of processors based on the corresponding number of application threads and the corresponding number of concurrent memory tasks.

2. The computer program product of claim 1, wherein the number of concurrent memory tasks is less than the number of application threads.

3. The computer program product of claim 2, wherein determining the number of application threads comprises determining an optimal number of application threads to reduce resource contention.

4. The computer program product of claim 2, wherein determining the number of concurrent memory tasks comprises determining the number of concurrent memory tasks that results in an optimal combination of reduced latency due to resource contention and fewest wasted cycles.

5. The computer program product of claim 1, wherein determining the number of application threads and the number of concurrent memory tasks comprises determining a combination of the number of application threads and the number of concurrent memory tasks that results in a shortest execution time.

6. The computer program product of claim 1, wherein the computer readable program is stored in a computer readable storage medium in a data processing system and wherein the computer readable program was downloaded over a network from a remote data processing system.

7. The computer program product of claim 1, wherein the computer readable program is stored in a computer readable storage medium in a server data processing system and wherein the computer readable program is downloaded over a network to a remote data processing system for use in a computer readable storage medium with the remote system.

8. The computer program product of claim 1, wherein the computer readable program further causes the computing device to:

determine a number of concurrent compute tasks within the number of application threads, wherein the number of concurrent compute tasks is less than the number of application threads.

9. The computer program product of claim 1, wherein the computer readable program further causes the computing device to:

responsive to detecting a workload phase change by compute-communication ratio, determine a new number of application threads and a new number of concurrent memory tasks;

schedule the application threads, and the compute tasks and the memory tasks within each application thread, on the number of hardware threads of the plurality of processors based on the new number of application threads and the new number of concurrent memory tasks; and apply power management to the plurality of processors based on the new number of application threads and the new number of concurrent memory tasks.

10. The computer program product of claim 1, wherein applying power management to the plurality of processors comprises using dynamic voltage and frequency scaling on the plurality of processors.

11. An apparatus, comprising:

a plurality of processors; and a memory coupled to the plurality of processors, wherein the memory comprises instructions which, when executed by a given processor within the plurality of processors, cause the given processor to:

divide an application into application threads to be scheduled on the plurality of processors;

divide the application into serial regions and parallel regions;

decompose each application thread into compute tasks and memory tasks, wherein a compute task comprises a group of instructions that perform computational functions and wherein a memory task is a group of instructions that perform memory access operations;

for each parallel region, determine a corresponding number of application threads and a corresponding number of concurrent memory tasks, wherein the number of application threads and the number of concurrent memory tasks are less than the number of hardware threads of the plurality of processors;

for each parallel region, schedule the application threads, and the compute tasks and the memory tasks within each application thread, on the number of hardware threads of the plurality of processors based on the corresponding number of application threads and the corresponding number of concurrent memory tasks; and apply power management to the plurality of processors based on the corresponding number of application threads and the corresponding number of concurrent memory tasks.

12. The apparatus of claim 11, wherein the number of concurrent memory tasks is less than the number of application threads.

13. The apparatus of claim 12, wherein determining the number of application threads comprises determining an optimal number of application threads to reduce resource contention.

14. The apparatus of claim 12, wherein determining the number of concurrent memory tasks comprises determining the number of concurrent memory tasks that results in an optimal combination of reduced latency due to resource contention and fewest wasted cycles.

15. The apparatus of claim 11, wherein the instructions further cause the given processor to:

determine a number of concurrent compute tasks within the number of application threads, wherein the number of concurrent compute tasks is less than the number of application threads.

16. The apparatus of claim 11, wherein determining the number of application threads and the number of concurrent memory tasks comprises determining a combination of the number of application threads and the number of concurrent memory tasks that results in a shortest execution time.

17. The apparatus of claim 11, wherein the instructions further cause the given processor to:

responsive to detecting a workload phase change by compute-communication ratio, determine a new number of application threads and a new number of concurrent memory tasks;

schedule the application threads, and the compute tasks and the memory tasks within each application thread, on the number of hardware threads of the plurality of processors based on the new number of application threads and the new number of concurrent memory tasks; and apply power management to the plurality of processors based on the new number of application threads and the new number of concurrent memory tasks.

18. The apparatus of claim 11, wherein applying power management to the plurality of processors comprises using dynamic voltage and frequency scaling on the plurality of processors.

* * * * *